(12) United States Patent
Zeng et al.

(10) Patent No.: US 12,529,940 B1
(45) Date of Patent: Jan. 20, 2026

(54) SOFT LIGHT PANEL, LIGHT ADJUSTMENT SYSTEM, CAMERA SYSTEM, AND LIGHT ADJUSTMENT CONTROL METHOD

(71) Applicant: GODOX PHOTO EQUIPMENT CO., LTD., Guangdong (CN)

(72) Inventors: Weijun Zeng, Guangdong (CN); Haiting Huang, Guangdong (CN)

(73) Assignee: GODOX PHOTO EQUIPMENT CO., LTD., Guangdong (CN)

( * ) Notice: Subject to any disclaimer, the term of this patent is extended or adjusted under 35 U.S.C. 154(b) by 0 days.

(21) Appl. No.: 19/114,821

(22) PCT Filed: Sep. 5, 2024

(86) PCT No.: PCT/CN2024/117198
§ 371 (c)(1),
(2) Date: Mar. 25, 2025

(87) PCT Pub. No.: WO2025/189703
PCT Pub. Date: Sep. 18, 2025

(30) Foreign Application Priority Data

Mar. 15, 2024 (CN) .......................... 202410298771.7
Mar. 15, 2024 (CN) .......................... 202410298772.1

(51) Int. Cl.
*G03B 15/03* (2021.01)

(52) U.S. Cl.
CPC ...... *G03B 15/03* (2013.01); *G03B 2215/0592* (2013.01)

(58) Field of Classification Search
CPC ................................ G03B 15/03; G03B 15/05
See application file for complete search history.

(56) References Cited

U.S. PATENT DOCUMENTS 5,034,769 A * 7/1991 Takami ................ H05B 41/32
396/206
6,497,487 B2 * 12/2002 Lee ...................... H04N 9/3111
353/31

(Continued)

FOREIGN PATENT DOCUMENTS

| CN | 213957806 | 8/2021 |
| CN | 113723326 | 11/2021 |

(Continued)

OTHER PUBLICATIONS

CNIPA, First Office Action for CN Application No. 202410298771.7, Aug. 9, 2024.

(Continued)

*Primary Examiner* — Eric T Eide
(74) *Attorney, Agent, or Firm* — Hodgson Russ LLP

(57) ABSTRACT

A soft light panel includes an electrically controlled atomization film and a control box, and the electrically controlled atomization film is electrically connected to the control box. The control box includes a communication module, a regulation module, an inverter circuit module, and a direct current module. The communication module is electrically connected to the regulation module, the regulation module is electrically connected to the inverter circuit module, the inverter circuit module is electrically connected to the electrically controlled atomization film, and the direct current module is electrically connected to the regulation module and the inverter circuit module. The control box can adjust the voltage and frequency of the alternating current output to the electrically controlled atomization film based on the adjustment control signals sent by an external control device, so as to adjust the atomization degree of the electrically controlled atomization film.

19 Claims, 7 Drawing Sheets

(56) References Cited

U.S. PATENT DOCUMENTS

| | | | | |
|---|---|---|---|---|
| 2011/0249427 A1* | 10/2011 | Rooms | ................... | F21V 31/00 |
| | | | | 362/147 |
| 2013/0050291 A1* | 2/2013 | Nobori | ................ | H04N 9/3197 |
| | | | | 345/690 |
| 2020/0413517 A1* | 12/2020 | Cao | ........................ | H05B 45/10 |

FOREIGN PATENT DOCUMENTS

| | | |
|---|---|---|
| CN | 114017689 | 2/2022 |
| CN | 115993750 | 4/2023 |
| CN | 219612080 | 8/2023 |
| CN | 118019184 | 5/2024 |
| CN | 118151472 | 6/2024 |
| JP | 2021013092 | 2/2021 |
| WO | 2023066059 | 4/2023 |

OTHER PUBLICATIONS

WIPO, International Search Report for PCT/CN2024/117198, Oct. 21, 2024.

\* cited by examiner

Generating Adjustment Control Signals, Adjustment Control Signals Include Voltage Adjustment Control Signal — S810

Generating Adjustment Control Signals, Adjustment Control Signals Include Voltage Adjustment Control Signal — S820

FIG. 8

Generating Adjustment Control Signals, Adjustment Control Signals Include Voltage Adjustment Control Signal and Frequency Adjustment Control Signal — S910

Adjusting Alternating Voltage Input to Electronically Controlled Atomization Film based on Voltage Adjustment Control Signal to Adjust Atomization Degree of Electronically Controlled Atomization Film — S920

Adjusting Frequency of Alternating Current Input to Electronically Controlled Atomization Film based on Frequency Adjustment Control Signal to Make Operation Frequency of Electronically Controlled Atomization Film Match Shooting Frequency of Camera — S930

FIG. 9

SOFT LIGHT PANEL, LIGHT ADJUSTMENT SYSTEM, CAMERA SYSTEM, AND LIGHT ADJUSTMENT CONTROL METHOD

CROSS-REFERENCE TO RELATED APPLICATIONS

The present application is a national stage entry under 37 U.S.C. § 371 of International Application No. PCT/CN2024/117198, filed on Sep. 5, 2024, which claims priority to Chinese Patent Application No. 202410298771.7, filed on Mar. 15, 2024, and Chinese Patent Application No. 202410298772.1, filed on Mar. 15, 2024. The entire disclosures of the above-identified applications are hereby incorporated herein by reference.

TECHNICAL FIELD

The present application relates to the technical field of photographic lighting, and particularly to a soft light panel, a light adjustment system, a camera system, and a light adjustment control method.

BACKGROUND

In today's video shooting scenarios, to make the light shining on the person or object being photographed softer, a soft light panel is generally placed between the photographic light and the person or object being photographed, which allows the light emitted by the photographic light to be scattered by the soft light panel before shining on the person or object. However, for different lighting effect requirements, it is necessary to replace soft light panels with different atomization degrees correspondingly to adjust the softness of the light. The operation is very cumbersome and cannot well meet the fast-paced shooting environment.

SUMMARY

There are provided a soft light panel, a light adjustment system, a camera system, and a light adjustment control method according to embodiments of the present application. The technical solution is as below.

According to a first aspect of embodiments of the present application, there is provided a soft light panel, which includes:
  an electronically controlled atomization film and a control box, wherein the electronically controlled atomization film is electrically connected to the control box;
  the control box includes a communication module, a regulation module, an inverter circuit module, and a direct current module;
  the communication module is electrically connected to the regulation module, the regulation module is electrically connected to the inverter circuit module, the inverter circuit module is electrically connected to the electronically controlled atomization film, and the direct current module is electrically connected to the regulation module and the inverter circuit module;
  the direct current module is configured to provide direct current power for the regulation module and the inverter circuit module;
  the communication module is configured to establish a communication connection with an external control device to receive adjustment control signals sent by the external control device;
  the adjustment control signals include a voltage adjustment control signal and a frequency adjustment control signal;
  the regulation module is configured to output a voltage output signal corresponding to the voltage adjustment control signal to the inverter circuit module based on the voltage adjustment control signal, and output a frequency output signal corresponding to the frequency adjustment control signal to the inverter circuit module based on the frequency adjustment control signal; and
  the inverter circuit module is configured to output an adjusted alternating voltage to the electronically controlled atomization film based on the voltage output signal to adjust an atomization degree of the electronically controlled atomization film, and output an adjusted frequency of the alternating current to the electronically controlled atomization film based on the frequency output signal to adjust an operation frequency of the electronically controlled atomization film.

According to a second aspect of embodiments of the present application, there is provided a light adjustment system, including:
  a control device;
  the soft light panel according to any one of embodiments of the present application, in communication connection with the control device;
  the control device is configured to send adjustment control signals to the soft light panel, to make an atomization degree and an operation frequency of the soft light panel be adjustable; the adjustment control signals include a voltage adjustment control signal and a frequency adjustment control signal;
  a light-emitting component, the soft light panel is provided on a light-emitting side of the light-emitting component.

According to a third aspect of embodiments of the present application, there is provided a light adjustment control method, applied to the light-emitting component in the light adjustment system according to any one of embodiments of the present application;
  the method includes:
  obtaining an adjustment amount of an atomization degree of the electronically controlled atomization film;
  determining compensation amount of light-emitting parameters of the light-emitting component based on the adjustment amount of the atomization degree and a preset corresponding relationship between the adjustment amount of the atomization degree and the compensation amount of the light-emitting parameters; and
  adjusting the light-emitting parameters of the light-emitting component based on the compensation amount of the light-emitting parameters of the light-emitting component, to make the light-emitting component emit light based on the adjusted light-emitting parameters.

According to a fourth aspect of embodiments of the present application, there is provided a light adjustment control method, applied to the soft light panel in the light adjustment system according to any one of embodiments of the present application;
  the method includes:
  receiving adjustment control signals sent by the control device, where the adjustment control signals include voltage adjustment control signals;
  adjusting the alternating voltage input to the electronically controlled atomization film based on the voltage adjustment control signal to adjust the atomization degree of the electronically controlled atomization film;

determining the adjustment amount of the atomization degree of the electronically controlled atomization film based on a change amount of the alternating voltage input to the electronically controlled atomization film, and sending the adjustment amount of the atomization degree of the electronically controlled atomization film to the light-emitting component, to make the light-emitting component adjust the light-emitting parameters accordingly based on the adjustment amount of the atomization degree of the electronically controlled atomization film.

According to a fifth aspect of embodiments of the present application, there is provided a camera system, including:

a light-emitting component;

the soft light panel according to any one of embodiments of the present application, provided on a light-emitting side of the light-emitting component;

a control device, in communication connection with the soft light panel;

the control device is configured to send adjustment control signals to the soft light panel, to make the atomization degree and an operation frequency of the soft light panel be adjustable;

the adjustment control signals include a voltage adjustment control signal and a frequency adjustment control signal;

a camera, in communication connection with the control device, to make the control device acquire the shooting frequency of the camera and generate a corresponding frequency adjustment control signal based on the shooting frequency of the camera.

According to a sixth aspect of embodiments of the present application, there is provided a light adjustment control method, applied to the camera system according to any one of embodiments of the present application:

the method includes;

generating adjustment control signals, the adjustment control signals include a voltage adjustment control signal and a frequency adjustment control signal;

adjusting the alternating voltage input to the electronically controlled atomization film based on the voltage adjustment control signal to adjust the atomization degree of the electronically controlled atomization film; and adjusting the frequency of the alternating current input to the electronically controlled atomization film based on the frequency adjustment control signal, to make the operation frequency of the electronically controlled atomization film match the shooting frequency of the camera.

According to a seventh aspect of embodiments of the present application, there is provided an electronic device, including a memory and a processor;

the memory stores a computer program, and when the processor executes the computer program, the method executed in any one of embodiments of the present application.

According to a eighteenth aspect of embodiments of the present application, there is provided a computer-readable storage medium, on which a computer program is stored;

when the computer program is executed by a processor, the method executed in any one of embodiments of the present application.

BRIEF DESCRIPTION OF THE DRAWINGS

FIG. 8 is a first flowchart of the light adjustment control method provided in the embodiment of the present application.

FIG. 9 is a second flowchart of the light adjustment control method provided in the embodiment of the present application.

DETAILED DESCRIPTION OF THE EMBODIMENTS

Embodiments embodying the features and advantages of the present application will be described in detail in the following description. It is to be understood that the present application is capable of various variations in different embodiments, none of which is outside the scope of the present application, and that the descriptions and drawings therein are intended to be illustrative in nature and are not intended to limit the present application.

In the description of the present application, it is to be understood that in the embodiments shown in the accompanying drawings, indications of orientation or positional relationships (such as up, down, left, right, forward and backward, etc.) are provided solely for the purpose of facilitating and simplifying the description of the present application, rather than indicating or implying that the device or element referred to must have a particular orientation, be constructed and operated in a particular orientation. These descriptions are appropriate when these elements are in the positions shown in the accompanying drawings. If the description of the position of these elements is changed, the indications of these orientations are changed accordingly.

Furthermore, the terms "first" and "second" are used only for descriptive purposes and are not to be understood as indicating or implying relative importance or implicitly specifying the number of technical features indicated. Thus, a feature defined with "first" and "second" may expressly or implicitly include one or more of the described features. In the description of the present application. "more than one" means two or more, unless otherwise expressly and specifically limited.

In today's video shooting scenarios, to make the light shining on the person or object being photographed softer, a soft light panel is generally placed between the photographic light and the person or object being photographed, which allows the light emitted by the photographic light to be scattered by the soft light panel before shining on the person or object. However, for different lighting effect requirements, it is necessary to replace soft light panels with different atomization degrees correspondingly to adjust the softness of the light. The operation is very cumbersome and cannot well meet the fast-paced shooting environment.

Based on this, the embodiments of the present application propose a soft light panel. Since the electronically controlled atomization film is electrically connected to the control box, the control box can be used to adjust the alternating voltage input to the electronically controlled atomization film, so as to adjust the atomization degree of the electronically controlled atomization film. There is no need to frequently replace the soft light panel, the operation is convenient, and it can meet the fast-paced shooting requirements.

Figure 1:
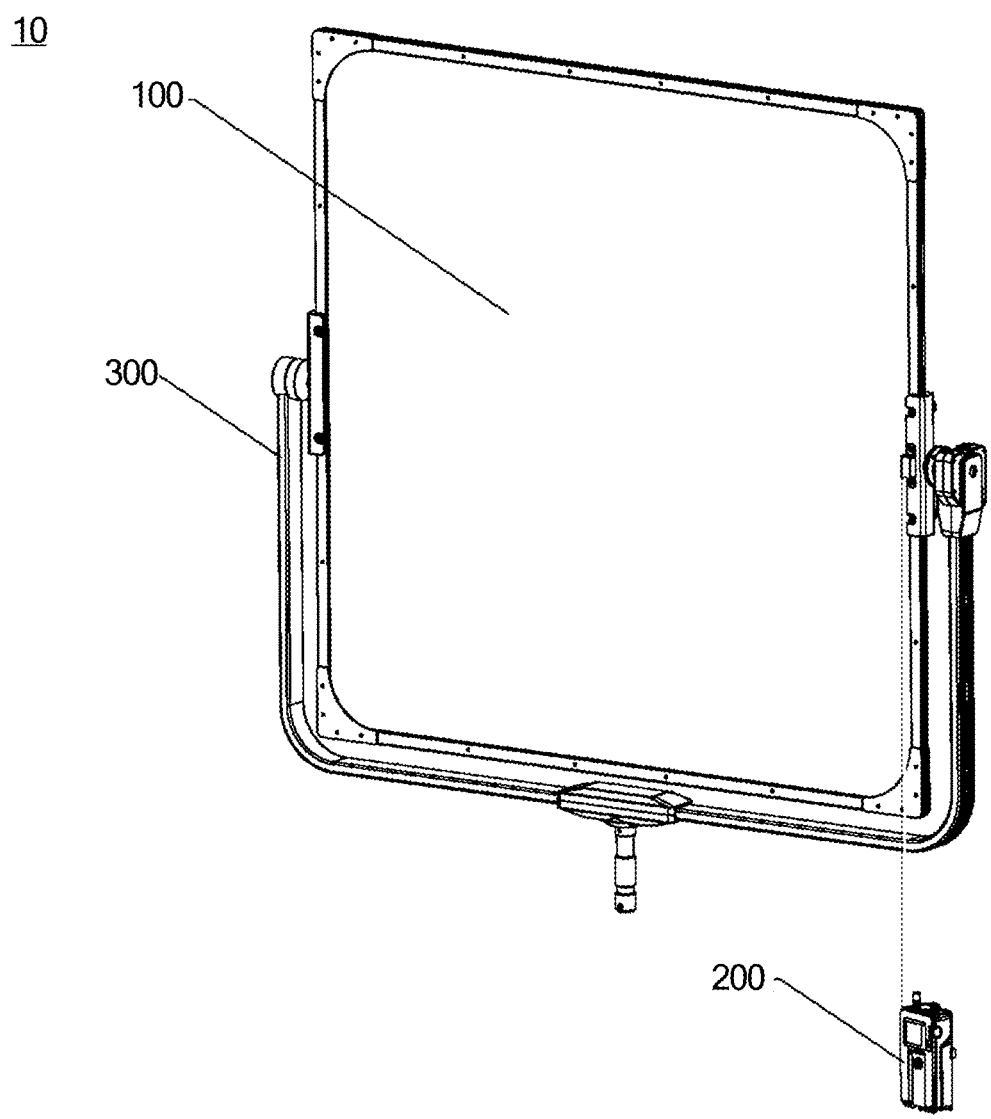
FIG. 1 is a schematic structural diagram of a soft light panel provided in the embodiment of the present application.

Referring to FIG. 1. FIG. 1 is a schematic structural diagram of the soft light panel provided in the embodiment of the present application. As shown in FIG. 1, the soft light panel 10 includes an electronically controlled atomization film 100, a control box 200, and a support frame 300. The electronically controlled atomization film 100 is provided on a support frame 300, and the support frame 300 can be flipped horizontally and vertically to adjust the angle of the electronically controlled atomization film 100. The electronically controlled atomization film 100 is electrically connected to the control box 200.

In the embodiments of the present application, by setting the electrical connection between the electronically controlled atomization film 100 and the control box 200, the control box 200 can be controlled to adjust the alternating voltage input to the electronically controlled atomization film 100, so as to adjust the atomization degree of the electronically controlled atomization film. There is no need to frequently replace the soft light panel, the operation is convenient, and it can meet the fast-paced shooting requirements.

Figure 2:
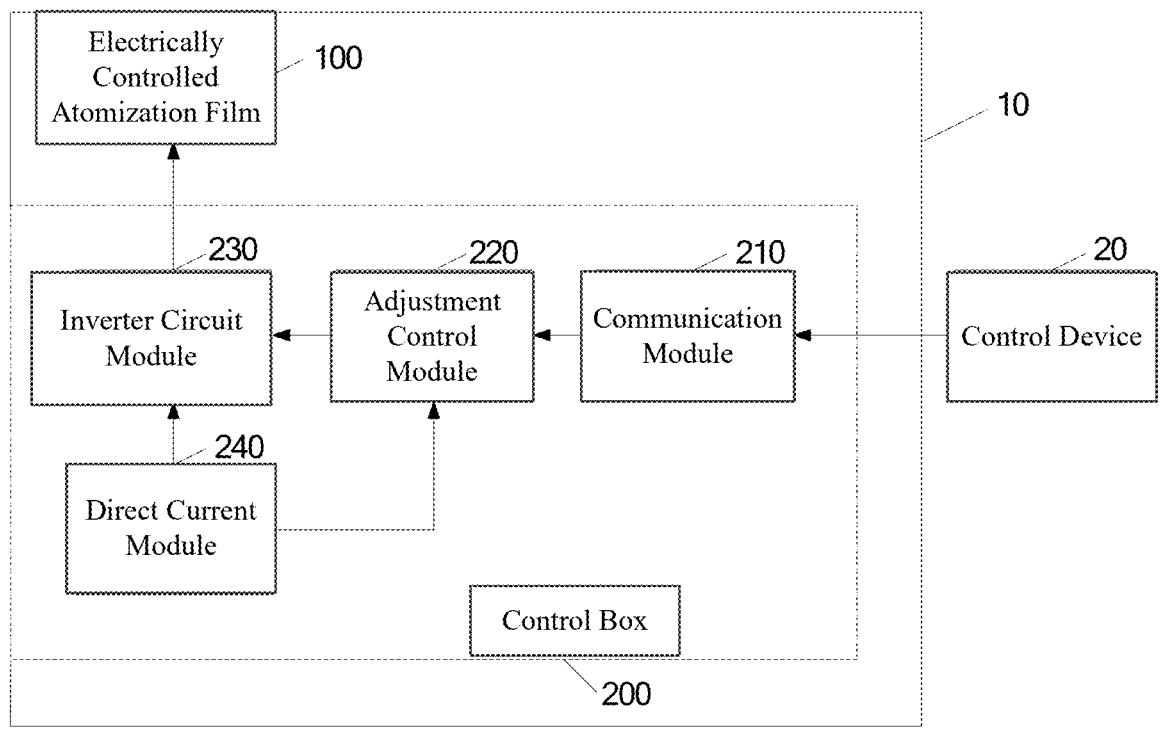
FIG. 2 is a structural block diagram of the soft light panel provided in the embodiment of the present application.

Referring to FIG. 2. FIG. 2 is a structural block diagram of the soft light panel provided in the embodiment of the present application. As shown in FIG. 2, the soft light panel 10 includes an electronically controlled atomization film 100 and a control box 200, and the electronically controlled atomization film 100 is electrically connected to the control box 200. The control box 200 includes a communication module 210, a regulation module 220, an inverter circuit module 230, and a direct current module 240. The communication module 210 is electrically connected to the regulation module 220, the regulation module 220 is electrically connected to the inverter circuit module 230, the inverter circuit module 230 is electrically connected to the electronically controlled atomization film 100, and the direct current module 240) is electrically connected to the regulation module 220 and the inverter circuit module 230.

In the embodiments of the present application, the direct current module 240) can be configured to provide direct current power for the regulation module 220 and the inverter circuit module 230. The communication module 210 can be configured to establish a communication connection with an external control device 20 to receive the adjustment control signals sent by the external control device 20. The adjustment control signals include voltage adjustment control signals. The regulation module 220 can be configured to output a voltage output signal corresponding to the voltage adjustment control signal to the inverter circuit module 230) based on the voltage adjustment control signal, so as to drive the inverter circuit module 230 to output the adjusted alternating voltage to the electronically controlled atomization film 100 to adjust the atomization degree of the electronically controlled atomization film 100.

In the embodiments of the present application, the electronically controlled atomization film 100 is a film made of special materials, usually formed by two pieces of glass sandwiching a layer or multiple layers of film materials, including a dimming layer of liquid crystal molecules. The electronically controlled atomization film 100 needs an alternating voltage to change its atomization degree. The principle of the electronically controlled atomization film 100 is mainly based on the electrochromic effect and the arrangement change of liquid crystal molecules under the action of an electric field to change its atomization degree. Specifically, when the electronically controlled atomization film is powered off, the liquid crystal molecules in the electronically controlled atomization film 100 will be randomly arranged, causing the light to scatter in all directions, making the glass present an opaque state of frosted or milky white. When powered on the liquid crystal molecules will be arranged in a direction perpendicular to the dimming film, allowing the light to pass through smoothly, making the glass transparent. This conversion between the transparent and opaque states can be completed instantaneously, achieving the atomization and clarity effects of the glass. By changing the voltage input to the electronically controlled atomization film 100, the atomization degree of the electronically controlled atomization film 100 can be changed. The electronically controlled atomization film 100 can be a dimming glass, such as an electronically controlled atomization glass.

In the embodiments of the present application, the direct current module 240 can be a battery or a power adapter that can be connected to the mains power. The inverter circuit module 230 is connected to the electronically controlled atomization film 100 through the alternating current output port. The communication module 210 can include a wireless communication unit and/or a wired communication unit. That is, the control box 200 can establish a wireless communication connection and/or a wired communication connection with the external control device 20 based on the communication module 210. The control device 20 can be a remote controller, a console, or an intelligent device installed with control software, such as a mobile terminal device like a mobile phone or a tablet computer installed with the corresponding control application program. The control device 20 can manually set the adjustment control signals through the user interface, for example, manually set the target voltage V1, and then send the corresponding voltage adjustment control signal to the regulation module 220 through the communication module 210, so that the regulation module 220 can output the corresponding voltage output signal to the inverter circuit module 230. Thus, the inverter circuit module 230 can correspondingly output the target voltage V1 of the adjusted alternating current to the electronically controlled atomization film 100 to adjust the atomization degree of the electronically controlled atomization film 100. That is, the control box 200 can adjust the alternating voltage input to the electronically controlled atomization film 100, so as to adjust the atomization degree of the electronically controlled atomization film 100.

In an embodiment of the present application, the control device 20 can also determine the atomization degree requirement according to the captured shooting target type, ambient light brightness and other factors by the intelligent camera system, then determine the target voltage based on the atomization degree requirement, and then generate the voltage adjustment control signal corresponding to the target voltage. The control device 20 can also generate the corresponding voltage adjustment control signal after adjusting the voltage through the operation interface corresponding to the corresponding software or the remote controller for voltage adjustment (which can be knob adjustment and button adjustment). The present application does not specifically limit the way in which the control device 20 generates the adjustment control signals.

It should be noted that the adjustment method of the atomization degree can be a one-step adjustment method. That is, the target atomization degree can be determined according to the shooting scene, and then the target voltage corresponding to the target atomization degree can be determined based on the mapping relationship between the atomization degree and the voltage, so as to adjust the atomization degree to the target atomization degree in one step by adjusting the voltage input to the electronically controlled atomization film 100 to be the target voltage. The adjustment method of the atomization degree can also be a method of continuous adjustment until it meets the requirement of the atomization degree requirement. That is, the magnitude of the alternating voltage input to the electronically controlled atomization film 100 is continuously adjusted, for example, the alternating voltage input to the electronically controlled atomization film 100 is gradually increased, the adjustment of the alternating voltage input to the electronically controlled atomization film 100 will not stop until the light adjustment at the shooting scene meets the requirement of the atomization degree. The specific adjustment methods can be various and will not be listed one by one here. Any method of adjusting the atomization degree of the electronically controlled atomization film 100 by adjusting the alternating voltage input to the electronically controlled atomization film 100 falls within the protection scope of the 20 present application.

In the embodiments of the present application, the adjustment control signals (such as voltage adjustment control signals) are generated by the external control device 20 and sent to the control box 200. Thus, the control box 200 only needs to adjust the alternating voltage input to the electronically controlled atomization film 100 based on the voltage adjustment control signal sent by the external control device 20, to correspondingly adjust the atomization degree of the electronically controlled atomization film 100, thereby making the atomization degree of the proposed soft light panel 10 adjustable.

If an electronically controlled atomization film is used as a soft light panel to adjust the softness of the light, due to the mismatch between the frequency of the alternating current input to the electronically controlled atomization film and the shooting frequency of the camera, stroboscopic stripes will be displayed on the video shot by the camera, which greatly affects the shooting imaging effect.

Based on this, in an embodiment of the present application, the adjustment control signals can include a voltage adjustment control signal and a frequency adjustment control signal. Correspondingly, the regulation module 220 can include a voltage regulation unit 221 and a frequency regulation unit 222, and both the voltage regulation unit 221 and the frequency regulation unit 222 are electrically connected to the inverter circuit module 230. Thus, the voltage regulation unit 221 can output a voltage output signal corresponding to the voltage adjustment control signal based on the voltage adjustment control signal. The frequency regulation unit 222 can output a frequency output signal corresponding to the frequency adjustment control signal based on the frequency adjustment control signal.

In the embodiments of the present application, since the electronically controlled atomization film 100 works under the drive of alternating current, its atomization state will also change according to the frequency of the alternating current, and then the light passing through the electronically controlled atomization film 100 will also flicker according to the frequency of the alternating current. However, due to its high flicker frequency, the human eye cannot recognize it. In the video shooting scenario, due to the high shooting frequency of the camera, it can recognize the flicker change of the light. Therefore, when the frequency of the alternating current input to the electronically controlled atomization film 100 does not match the shooting frequency of the camera, the camera will capture these changes of the light, and then stroboscopic stripes will be displayed on the captured image, affecting the shooting imaging effect. Based on this, a soft light panel with only adjustable atomization degree may still not be able to well meet the shooting requirements, and it is also necessary for this soft light panel with adjustable atomization degree to have an adjustable frequency, that is, it is necessary to provide a soft light panel with atomization degree and operation frequency that are both adjustable. For example, the frequency of the alternating current input to the electronically controlled atomization film 100 can be adjusted to match the shooting frequency of the camera to solve the problem of stroboscopic stripes caused by the mismatch between the frequency of the alternating current input to the electronically controlled atomization film 100 and the shooting frequency of the camera.

In this regard, the control device 20 can generate the corresponding voltage adjustment control signal and the frequency adjustment control signal based on the shooting requirements, and then send them to the control box 200 through the communication module 210. Thus, the voltage regulation unit 221 in the regulation module 220 can output a voltage output signal corresponding to the voltage adjustment control signal based on the voltage adjustment control signal to the inverter circuit module 230, so as to drive the inverter circuit module 230 to output the adjusted alternating voltage, thereby adjusting the atomization degree of the electronically controlled atomization film 100. And the frequency regulation unit 222 in the regulation module 220 can output a frequency output signal corresponding to the frequency adjustment control signal based on the frequency adjustment control signal to the inverter circuit module 230, so as to drive the inverter circuit module 230 to output the adjusted frequency of the alternating current, thereby adjusting the frequency input to the electronically controlled atomization film 100. Thus, the proposed soft light panel 10 can have both adjustable atomization degree and operation frequency.

In the embodiments of the present application, the frequency adjustment method can be the same as the atomization degree adjustment method, and details will not be repeated here. The embodiments of the present application do not limit the adjustment sequence of the frequency and the atomization degree, and the frequency and the atomization degree can be adjusted simultaneously. For example, the control device 20 can generate the voltage adjustment control signal and the frequency adjustment control signal based on the shooting requirements, and then the communication module 210 sends them to the control box 200. Thus, the voltage regulation unit 221 in the regulation module 220 can output a voltage output signal corresponding to the voltage adjustment control signal based on the voltage adjustment control signal to the inverter circuit module 230. And the frequency regulation unit 222 in the regulation module 220 can output a frequency output signal corresponding to the frequency adjustment control signal based on the frequency adjustment control signal to the inverter circuit module 230. After the inverter 20) circuit module 230 receives the voltage output signal and the frequency output signal, it can output the target voltage and the alternating current of the target frequency correspondingly based on the voltage output signal and the frequency output signal, and can simultaneously adjust the alternating voltage and the frequency of the alternating current input to the electronically controlled atomization film 100. It is also possible to adjust the frequency first and then the atomization degree. For example, the target frequency that matches the shooting frequency of the camera can be determined first based on the shooting frequency of the camera. The control device 20 generates the frequency adjustment control signal corresponding to this target frequency and sends it to the control box 200. The frequency regulation unit 222 in the regulation module 220 can output a frequency output signal corresponding to the frequency adjustment control signal to the inverter circuit module 230 based on this frequency adjustment control signal, so as to drive the inverter circuit module 230 to output the alternating current with the target frequency. Thus, the adjustment of the frequency of the alternating current input to the electronically controlled atomization film 100 is completed first. Then, the target voltage can be determined based on the atomization degree requirement at the shooting scene. The control device 20 generates the voltage adjustment control signal corresponding to the target voltage and sends it to the control box 200. The voltage regulation unit 221 in the regulation module 220 can output a voltage output signal corresponding to the voltage adjustment control signal to the inverter circuit module 230 based on this voltage adjustment control signal, so as to drive the inverter circuit module 230 to output the alternating current with the target voltage. Thus, the adjustment of the output voltage is completed. It is also possible to adjust the atomization degree first and then the frequency, and details will not be repeated here.

Figure 3:
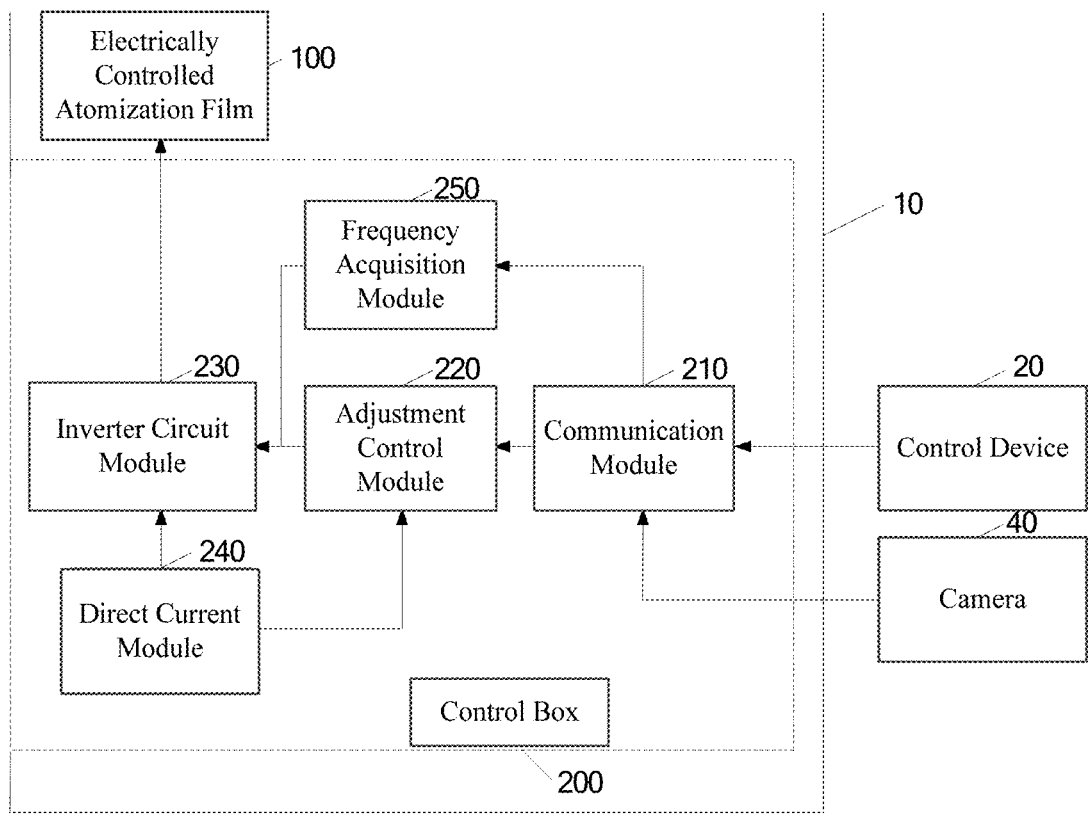
FIG. 3 is another structural block diagram of the soft light panel provided in the embodiment of the present application.

Referring to FIG. 3. FIG. 3 is another structural block diagram of the soft light panel provided in the embodiment of the present application. As shown in FIG. 3, the soft light panel 10 includes an electronically controlled atomization film 100 and a control box 200, and the electronically controlled atomization film 100 is electrically connected to the control box 200. The control box 200 includes a communication module 210, a regulation module 220, an inverter circuit module 230, a direct current module 240, and a frequency acquisition module 250. The communication module 210 is electrically connected to the regulation module 220, the regulation module 220 is electrically connected to the inverter circuit module 230, the inverter circuit module 230 is electrically connected to the electronically controlled atomization film 100, the direct current module 240 is electrically connected to the regulation module 220 and the inverter circuit module 230, and the frequency acquisition module 250 is electrically connected to the communication module 210) and the inverter circuit module 230).

In the embodiments of the present application, the direct current module 240) can be configured to provide direct current power for the regulation module 220 and the inverter circuit module 230. The communication module 210 can be configured to establish a communication connection with an external control device 20 to receive the adjustment control signals sent by the external control device 20, and the adjustment control signals include a voltage adjustment control signal. And the communication module 210 can be configured to establish a communication connection with the camera 40 to obtain the shooting frequency of the camera 40. The regulation module 220 can be configured to output a voltage output signal corresponding to the voltage adjustment control signal to the inverter circuit module 230 based on the voltage adjustment control signal, so as to drive the inverter circuit module 230 to output the adjusted alternating voltage to the electronically controlled atomization film 100 to adjust the atomization degree of the electronically controlled atomization film 100. The frequency acquisition module 250 can be configured to obtain the shooting frequency of the camera 40, generate a corresponding frequency adjustment signal based on the shooting frequency of the camera 40, and output the frequency adjustment signal to the inverter circuit module 230, so that the inverter circuit module 230 can output the frequency of the alternating current that matches the shooting frequency of the camera 40 based on the frequency adjustment signal.

In the embodiments of the present application, based on the voltage adjustment control signal sent by the control device 20, the control box 200 can adjust the alternating voltage input to the electronically controlled atomization film 100, thereby adjusting the atomization degree of the electronically controlled atomization film 100. Based on the communication connection with the camera 40, the control box 200 can obtain the shooting frequency of the camera 40. Thus, the control box 200 can further adjust the frequency of the alternating current input to the electronically controlled atomization film 100 based on the shooting frequency of the camera 40, that is, the frequency of the alternating current input to the electronically controlled atomization film 100 can be adjusted to a frequency that matches the shooting frequency of the camera 40. The frequency that matches the shooting frequency of the camera 40 can be a frequency that is a multiple of the shooting frequency of the camera 40. For example, if the shooting frequency of the camera 40 is f1, the frequency of the alternating current input to the electronically controlled atomization film 100 can be adjusted to 2f1, 3f1, etc. Thus, both the atomization degree and the operation frequency of the soft light panel 10 can be adjusted. Since the frequency is adjustable, the operation frequency of the soft light panel can be made to match the shooting frequency of the camera 40, which can meet the shooting requirements of the camera and ensure that there are no stroboscopic stripes in the captured images. And since the atomization degree is adjustable, there is no need to frequently replace the soft light panel, the operation is convenient, and it can meet the fast-paced shooting requirements.

In the embodiments of the present application, the adjustment control signal can include a voltage adjustment control signal. The adjustment control signal can also include a voltage adjustment control signal and a frequency adjustment control signal. When the control signal includes a voltage adjustment control signal and a frequency adjustment control signal, the control device 20 can send the voltage adjustment control signal and the frequency adjustment control signal to the control box 200, so that the control box 200 can adjust the voltage and frequency of the alternating current input to the electronically controlled atomization film 100, to make the atomization degree and the operation frequency of the soft light panel 10 adjustable. The control device 20 also can send a voltage adjustment control signal to the control box 200, so that the control box 200 can adjust the voltage of the alternating current input to the electronically controlled atomization film 100. Then, the frequency acquisition module 250 of the control box 200 can obtain the shooting frequency of the camera 40 and generate a corresponding frequency adjustment signal, so that the control box 200 can adjust the frequency of the alternating current input to the electronically controlled atomization film 100 based on this frequency adjustment signal, to make the atomization degree and the operation frequency of the soft light panel 10 adjustable.

Figure 4:
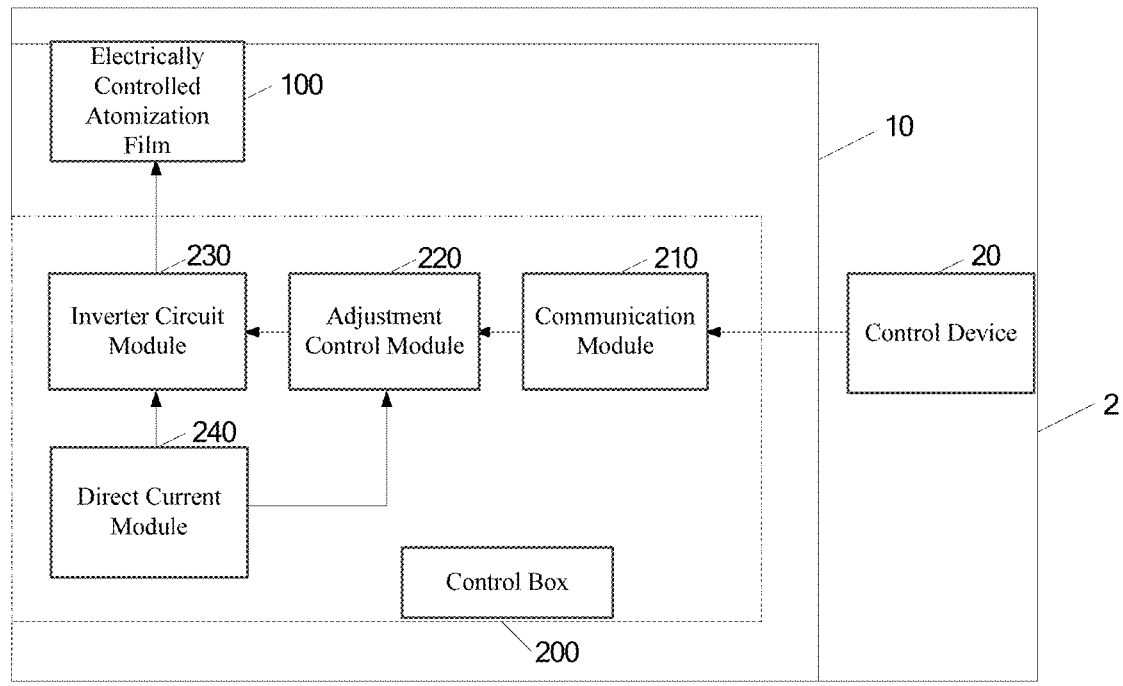
FIG. 4 is a structural block diagram of the light adjustment system provided in the embodiment of the present application.

Referring to FIG. 4. FIG. 4 is a structural block diagram of the light adjustment system provided in the embodiment of the present application. As shown in FIG. 4, the light adjustment system 2 includes a control device 20 and the soft light panel 10 provided in any embodiment of the present application. The soft light panel 10 is in communication connection with the control device 20, and the control device 20 is configured to send adjustment control signals to the soft light panel 10 to make the atomization degree and the operation frequency of the soft light panel 10 adjustable. The adjustment control signals include a voltage adjustment control signal and a frequency adjustment control signal.

In the embodiments of the present application, the soft light panel 10 is in communication connection with the control device 20, so the control device can send a voltage adjustment control signal to the soft light panel 10 to adjust the alternating voltage input to the electronically controlled atomization film, thus adjusting the atomization degree of the electronically controlled atomization film. And the control device can send a frequency adjustment control signal to the soft light panel 10 to adjust the frequency of the alternating current input to the electronically controlled atomization film, thus adjusting the operation frequency of the electronically controlled atomization film. Thus, there is no need to frequently replace the soft light panel, the operation is convenient, and it can meet the fast-paced shooting requirements.

Figure 5:
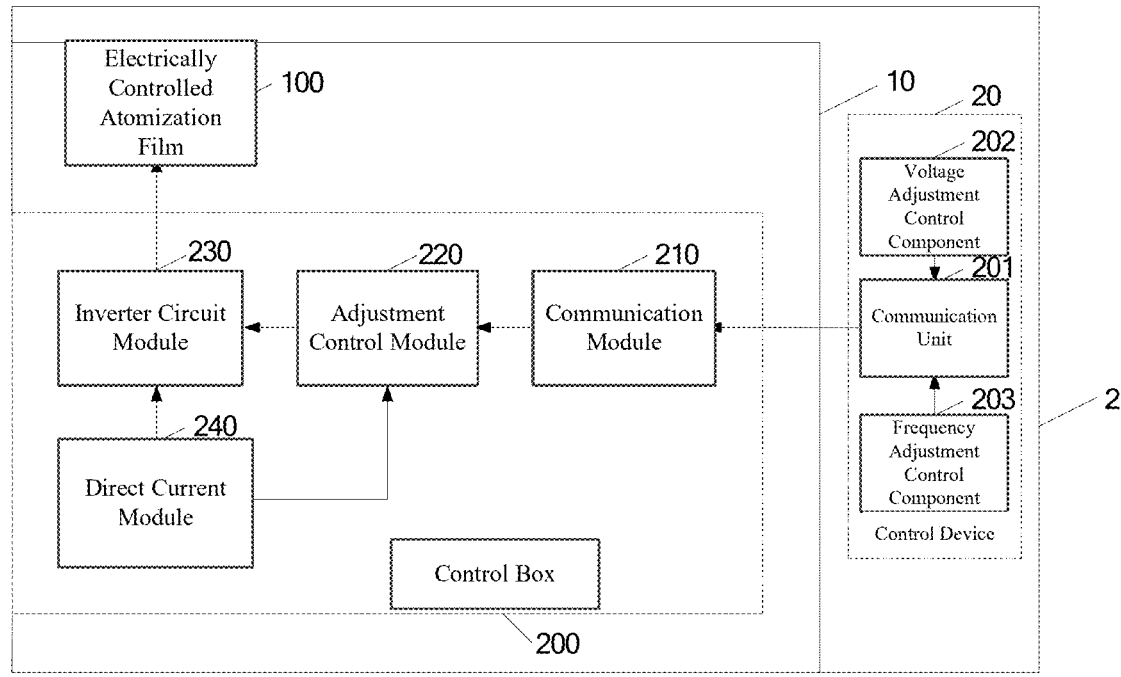
FIG. 5 is another structural block diagram of the light adjustment system provided in the embodiment of the present application.

Referring to FIG. 5. FIG. 5 is another structural block diagram of the light adjustment system provided in the embodiment of the present application. As shown in FIG. 5, the light adjustment system 2 includes a control device 20 and the soft light panel 10 provided in any embodiment of the present application. The soft light panel 10 is in communication connection with the control device 20, and the control device 20 is configured to send adjustment control signals to the soft light panel 10 to make the atomization degree and the operation frequency of the soft light panel 10 adjustable. The adjustment control signals include a voltage adjustment control signal and a frequency adjustment control signal. The control device 20 includes a communication unit 201, a voltage adjustment control component 202, and a frequency adjustment control component 203, and the communication unit 201 is in communication connection with the communication module 210 in the soft light panel 10.

The voltage adjustment control component 202 is electrically connected to the communication unit 201 to send a voltage adjustment control signal to the soft light panel 10 through the communication unit 201.

The frequency adjustment control component 203 is electrically connected to the communication unit 201 to send a frequency adjustment control signal to the soft light panel 10 through the communication unit 201.

In the embodiments of the present application, the control device 20 is provided with a communication unit 201, so a communication connection between the control device 20 and the soft light panel 10 can be established based on the communication unit 201 and the communication module 210 in the soft light panel 10, thus realizing the information interaction between the control device 20 and the soft light panel 10. For example, the control device 20 can send a voltage adjustment control signal and a frequency adjustment control signal to the control box 200 of the soft light panel 10, so that the control box 200 can adjust the voltage and frequency of the alternating current input to the electronically controlled atomization film 100 based on the voltage adjustment control signal and the frequency adjustment control signal, to make the atomization degree and the operation frequency of the soft light panel 10 adjustable. The control device 20 is also provided with a voltage adjustment control component 202 and a frequency adjustment control component 203, so that the voltage adjustment control component 202 can adjust the voltage and generate the corresponding voltage adjustment control signal. The frequency adjustment control component 203 can adjust the frequency and generate the corresponding frequency adjustment control signal.

The control device 20 can be a remote controller, a console, or an intelligent device installed with control software, such as a mobile terminal device like a mobile phone or a tablet computer installed with the corresponding control application program. The adjustment control signals can be manually set through the user interface in the control device 20, for example, manually set the target voltage V1 and the target frequency f1, and then the corresponding voltage adjustment control signal and frequency adjustment control signal are sent to the regulation module 220 through the communication module 210, so that the regulation module 220 can output the corresponding voltage output signal and frequency output signal to the inverter circuit module 230. Thus, the inverter circuit module 230 can correspondingly output the target voltage and target frequency of the adjusted alternating current to the electronically controlled atomization film 100 to adjust the atomization degree and the operation frequency of the electronically controlled atomization film 100. That is, the control box 200 can adjust the voltage and frequency of the alternating current input to the electronically controlled atomization film 100, thus adjusting the atomization degree and the operation frequency of the electronically controlled atomization film 100.

The control device 20 can also determine the atomization degree requirement according to the captured shooting target type, ambient light brightness and other factors by the intelligent camera system, then determine the target voltage based on the atomization degree requirement, and then generate the voltage adjustment control signal corresponding to the target voltage. The control device 20 can also be in communication connection with the camera 40 to obtain the shooting frequency of the camera 40, so as to determine the target operation frequency of the soft light panel based on the shooting frequency of the camera 40, and then generate the frequency adjustment control signal corresponding to the target operation frequency. The control device 20 can also generate the corresponding voltage adjustment control signal and frequency adjustment control signal after the voltage and frequency are adjusted through the operation interface corresponding to the corresponding software or the remote controller for voltage and frequency adjustment (which can be knob adjustment and button adjustment). The present application does not specifically limit the way in which the control device 20 generates the adjustment control signals.

Figure 6:
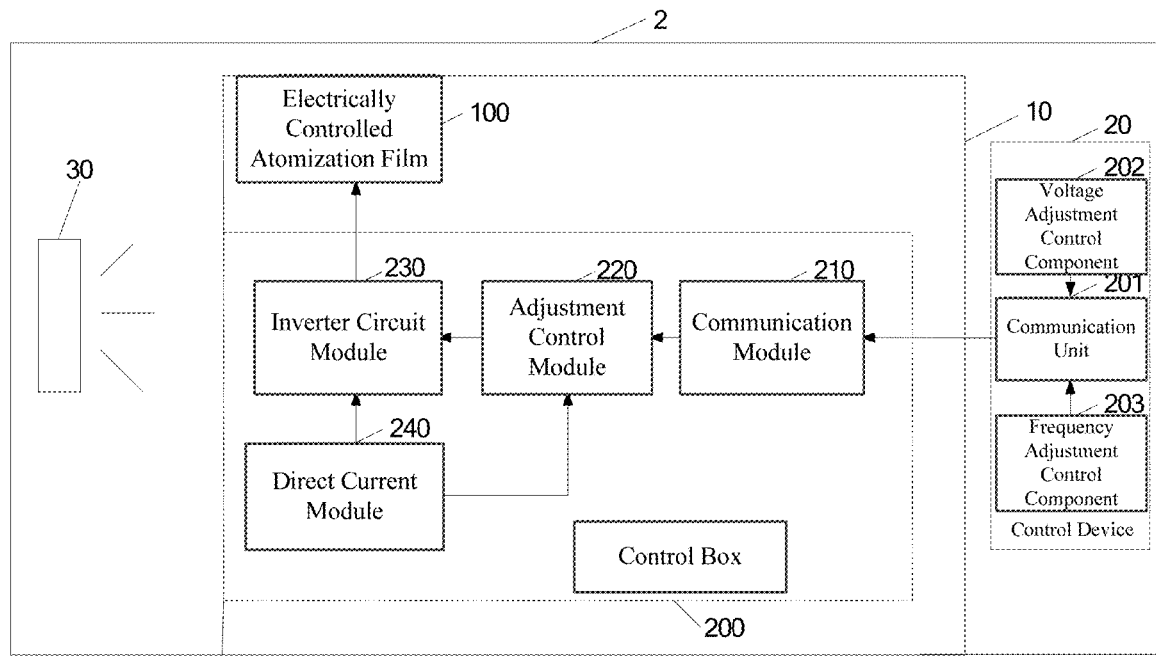
FIG. 6 is another structural block diagram of the light adjustment system provided in the embodiment of the present application.

Referring to FIG. 6. FIG. 6 is another structural block diagram of the light adjustment system provided in the embodiment of the present application. As shown in FIG. 6, the light adjustment system 2 includes a control device 20, a light-emitting component 30, and the soft light panel 10 provided in any embodiment of the present application. The soft light panel 10 is provided on a light-emitting side of the light-emitting component 30. The soft light panel 10 is in communication connection with the control device 20, and the control device 20 is configured to send adjustment control signals to the soft light panel 10 to make the atomization degree and the operation frequency of the soft light panel 10 adjustable. The adjustment control signals include a voltage adjustment control signal and a frequency adjustment control signal.

In the embodiments of the present application, the light-emitting component 30 can be a photographic light or a floodlight, etc. The soft light panel 10 is provided on a light-emitting side of the light-emitting component 30, so that the light emitted by the light-emitting component 30 can be scattered by the soft light panel 10 and then shine on the person or object being photographed. With the soft light panel 10 whose atomization degree and operation frequency are adjustable, the softness of the light can be adjusted according to different lighting effect requirements at the shooting scene. There is no need to frequently replace the soft light panel, the operation is convenient, and there will be no stroboscopic stripes in the captured images, the shooting requirements are met.

Figure 7:
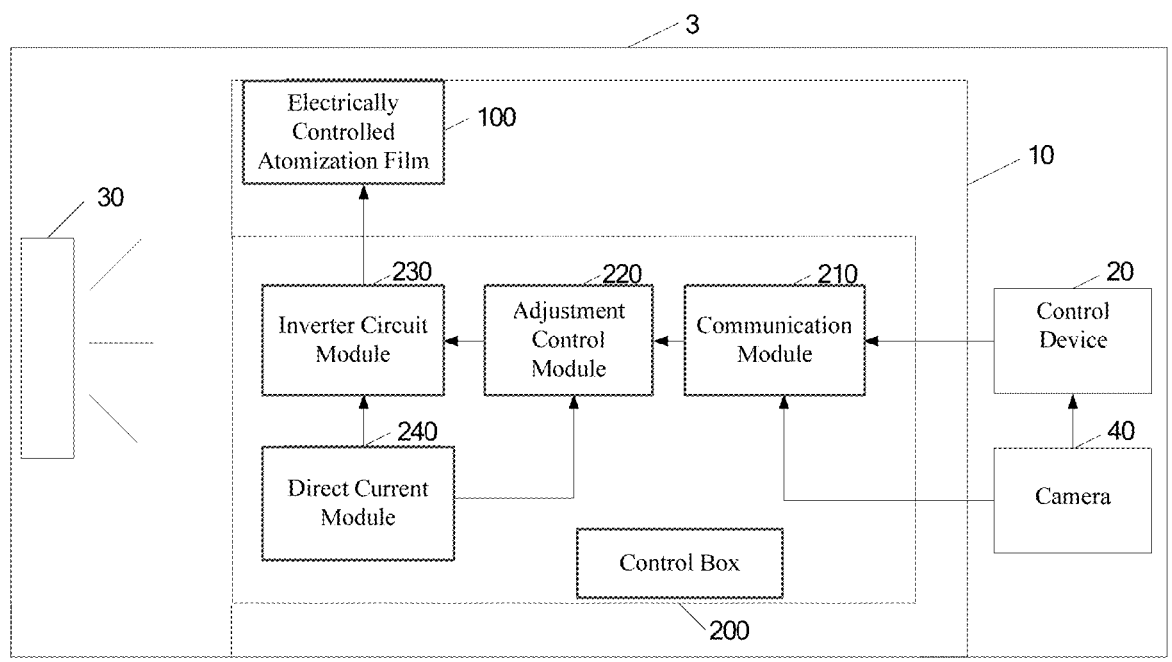
FIG. 7 is a structural block diagram of the camera system provided in the embodiment of the present application.

Referring to FIG. 7. FIG. 7 is a structural block diagram of the camera system provided in the embodiment of the present application. As shown in FIG. 7, the camera system 3 includes a light-emitting component 30, the soft light panel 10 proposed in any embodiment of the present application, a control device 20, and a camera 40. The soft light panel 10 is provided on the light-emitting side of the light-emitting component 30. The control device 20 is in communication connection with the soft light panel 10, and the control device 20 is configured to send adjustment control signals to the soft light panel 10 to make the atomization degree and the operation frequency of the soft light panel 10 adjustable. The adjustment control signals include a voltage adjustment control signal and a frequency adjustment control signal. The camera 40) is in communication connection with the control device 20, so that the control device 20 can obtain the shooting frequency of the camera 40 and generate a corresponding frequency adjustment control signal based on the shooting frequency of the camera 40.

In the embodiments of the present application, the control device 20 can generate a corresponding voltage adjustment control signal based on the atomization degree requirement and send it to the control box 200. And the control device 20 is in communication connection with the camera 40, so as to obtain the shooting frequency of the camera 40 and generate a corresponding frequency adjustment control signal based on the shooting frequency of the camera 40 and then send it to the control box 200, such that the control box 200 can adjust the voltage and frequency of the alternating current input to the electronically controlled atomization film 100 according to the voltage adjustment control signal and the frequency adjustment control signal, thus the atomization degree and the operation frequency of the soft light panel are adjustable.

In an embodiment of the present application, the camera 40 is also in communication connection with the soft light panel 10, so that the soft light panel 10 can obtain the shooting frequency of the camera 40 and generate a corresponding frequency adjustment control signal based on the shooting frequency of the camera 40.

In the embodiments of the present application, the camera 40 can be in communication connection with the control device 20, and the camera 40 can also be in communication connection with the soft light panel 10. Correspondingly, the frequency adjustment control signal can be generated by the control device 20 based on the shooting frequency of the camera 40, or can be generated by the soft light panel 10 based on the shooting frequency of the camera 40.

The camera system 3 in the embodiments of the present application includes the soft light panel 10, so that there is no need to frequently replace the soft light panel during the shooting process, the operation is convenient, and it can meet the fast-paced shooting requirements.

It should be noted that the soft light panel 10 proposed in the embodiments of the present application can be independent of the light adjustment system 2 and the camera system 3, can also be used as a component of the light adjustment system 2, or can be used as a component of the camera system 3.

Referring to FIG. 8, FIG. 8 is a first flowchart of the light adjustment control method provided in the embodiment of the present application, which is executed based on the light adjustment system 2 provided in any embodiment of the present application, and includes but is not limited to steps S810 to S820.

Step S810, generating adjustment control signals, the adjustment control signals include a voltage adjustment control signal;

Step S820, adjusting the alternating voltage input to the electronically controlled atomization film based on the voltage adjustment control signal to adjust the atomization degree of the electronically controlled atomization film.

In the embodiments of the present application, the control device 20 generates a voltage adjustment control signal based on the target voltage determined according to the shooting atomization degree requirement, and then sends it to the control box 200, so that the control box 200 can adjust the alternating voltage input to the electronically controlled atomization film 100 to be the target voltage based on the voltage adjustment control signal to adjust the atomization degree of the electronically controlled atomization film 100. For different light adjustment requirements, the corresponding atomization degrees are different. By adjusting the alternating voltage input to the electronically controlled atomization film 100, the atomization degree of the electronically controlled atomization film 100 can be adjusted until the atomization degree requirement is met. At the shooting scene, in order to meet different light adjustment requirements, there is no need to frequently replace the soft light panel. Instead, the light can be adjusted by adjusting the atomization degree of the soft light panel, the operation is convenient, and it can meet the fast-paced shooting requirements.

Referring to FIG. 9. FIG. 9 is a second flowchart of the light adjustment control method provided in the embodiment of the present application, which is executed based on the camera system 3 provided in any embodiment of the present application, and includes but is not limited to steps S910 to S930.

Step S910, generating adjustment control signals, the adjustment control signals include a voltage adjustment control signal and a frequency adjustment control signal;

Step S920, adjusting the alternating voltage input to the electronically controlled atomization film based on the voltage adjustment control signal to adjust the atomization degree of the electronically controlled atomization film;

Step S930, adjusting the frequency of the alternating current input to the electronically controlled atomization film based on the frequency adjustment control signal to make the operation frequency of the electronically controlled atomization film match the shooting frequency of the camera.

In the embodiments of the present application, the control device 20 generates a voltage adjustment control signal based on the target voltage determined based on the shooting atomization degree requirement, and then sends it to the control box 200, so that the control box 200 can adjust the alternating voltage input to the electronically controlled atomization film 100 based on the voltage adjustment control signal to adjust the atomization degree of the electronically controlled atomization film 100 until the atomization degree requirement is met. For different light adjustment requirements, the corresponding atomization degrees are different. By adjusting the alternating voltage input to the electronically controlled atomization film 100, the atomization degree of the electronically controlled atomization film 100 can be adjusted until the atomization degree requirement is met. The control device 20 obtains the shooting frequency of the camera 40 and generates the frequency adjustment control signal based on the shooting frequency of the camera 40, and then sends the frequency adjustment control signal to the control box 200, or the control box 200 directly obtains the shooting frequency of the camera 40 and generates the frequency adjustment control signal based on the shooting frequency of the camera 40. Thus, the control box 200 can adjust the frequency of the alternating current input to the electronically controlled atomization film 100 based on the frequency adjustment control signal to make the frequency of the alternating current input to the electronically controlled atomization 2 ( ) film 100 match the shooting frequency of the camera 40. Thus, by adjusting the alternating voltage input to the electronically controlled atomization film 100, different light adjustment requirements can be adapted. By adjusting the frequency of the alternating current input to the electronically controlled atomization film 100 to match the adjustment of the alternating voltage input to the electronically controlled atomization film 100, the shooting requirements of the camera can be met, such that there are no stroboscopic stripes in the captured images, and the shooting imaging effect can be ensured.

After adjusting the atomization degree of the soft light panel, the parameters such as the color temperature and brightness of the light passing through the soft light panel will also change. Therefore, in order to keep the parameters such as the color temperature and brightness of the light originally shining on the photographed object or person unchanged, the user needs to manually adjust the light-emitting parameters of the photographic light again after each adjustment of the atomization degree to compensate for the light-emitting parameters. In order to select the optimal lighting effect, the user will adjust the atomization degree of the soft light panel several times before each shooting, resulting in very cumbersome overall operation, which cannot well meet the fast pace of the shooting scene.

Based on this, the embodiments of the present application also propose a light adjustment control method. After adjusting the atomization degree of the soft light panel, the light-emitting parameters can be automatically adjusted accordingly according to the adjustment amount of the atomization degree to automatically compensate for the light-emitting parameters of the light passing through the soft light panel, so that the light-emitting parameters of the light passing through the soft light panel are consistent with the pre-determined target light-emitting parameters of the light. There is no need for the user to adjust manually, the operation is convenient, and it can meet the fast-paced shooting requirements.

Figure 10:
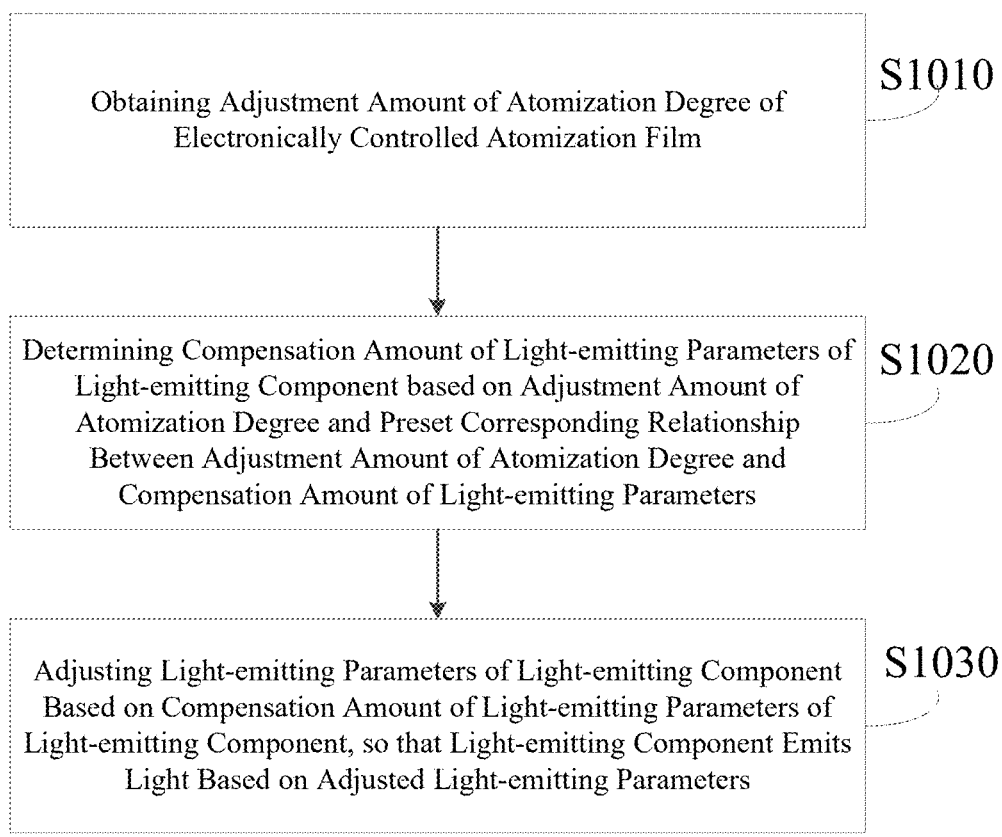
FIG. 10 is a third flowchart of the light adjustment control method provided in the embodiment of the present application.

Referring to FIG. 10. FIG. 10 is the third flowchart of the light adjustment control method provided in the embodiment of the present application, which is executed based on the light adjustment system 2 provided in any embodiment of the present application, and includes but is not limited to steps S1010 to S1030.

Step S1010, obtaining the adjustment amount of the atomization degree of the electronically controlled atomization film.

In the embodiments of the present application, after adjusting the atomization degree of the above-mentioned soft light panel, considering that the light-emitting parameters of the light passing through the soft light panel will change, the light-emitting parameters of the light passing through the soft light panel will be inconsistent with the pre-determined target light-emitting parameters of the light. Therefore, in order to make the light-emitting parameters of the light passing through the soft light panel consistent with the pre-determined target light-emitting parameters of the light, that is, in order to keep the parameters such as the color temperature and brightness of the light originally shining on the photographed object or person unchanged, the light-emitting component can obtain the adjustment amount of the atomization degree of the electronically controlled atomization film through the communication connection with the soft light panel whose atomization degree is adjustable, so as to further automatically adjust the light-emitting parameters of the light-emitting component according to the adjustment amount of the atomization degree. The determination methods of the adjustment amount of the atomization degree include: calculating the corresponding adjustment amount of the atomization degree based on the voltage difference input to the electronically controlled atomization film, or determining the corresponding atomization degree based on the voltage value input to the electronically controlled atomization film, then obtaining the atomization degree of the soft light panel before adjustment and the atomization degree of the soft light panel after adjustment, and subtracting the atomization degree of the soft light panel before adjustment from the atomization degree after adjustment to obtain the adjustment amount of the atomization degree of the soft light panel.

Step S1020, determining the compensation amount of the light-emitting parameters of the light-emitting component based on the adjustment amount of the atomization degree and a preset corresponding relationship between the adjustment amount of the atomization degree and the compensation amount of the light-emitting parameters.

In the embodiments of the present application, after the light-emitting component obtains the adjustment amount of the atomization degree of the soft light panel, it can determine the compensation amount of the light-emitting parameters of the light-emitting component based on the preset corresponding relationship between the adjustment amount of the atomization degree and the compensation amount of the light-emitting parameters. The light-emitting parameters can include luminous flux, luminous intensity, illuminance, brightness, luminous efficiency, color temperature, color rendering property, etc.

The preset corresponding relationship between the adjustment amount of the atomization degree and the compensation amount of the light-emitting parameters is a one-to-one correspondence mapping relationship between the adjustment amount of the atomization degree and the compensation amount of the light-emitting parameters, which can be a proportional mapping relationship. Taking the color temperature as an example, if the atomization degree increases by 10%, the color temperature parameter correspondingly increases by 100K. If the atomization degree decreases by 10%, the color temperature parameter correspondingly decreases by 100K. To keep the light-emitting parameters of the light originally shining on the photographed object or person unchanged, after adjusting the atomization degree of the soft light panel an infinite number of times, the light-emitting parameters of the light-emitting component are adjusted for the corresponding number of times, then the light-emitting parameters of the light-emitting component before and after adjustment are compared to obtain the compensation amount of the light-emitting parameters, and the atomization degrees of the soft light panel before and after adjustment are compared to obtain the adjustment amount of the atomization degree, the mapping relationship between the adjustment amount of the atomization degree and the compensation amount of the light-emitting parameters can be obtained.

It should be noted that since the voltage difference input to the electronically controlled atomization film corresponds to the adjustment amount of the atomization degree, the corresponding relationship between the adjustment amount of the atomization degree and the compensation amount of the light-emitting parameters can be converted into the corresponding relationship between the voltage difference input to the electronically controlled atomization film and the compensation amount of the light-emitting parameters.

In an embodiment of the present application, the compensation amount of the light-emitting parameters includes at least one of the brightness compensation amount and the color temperature compensation amount.

In the embodiments of the present application, considering that in the shooting scene, the color temperature and brightness in the light-emitting parameters have a great impact on the shooting effect, that is, the adjustment of the color temperature and brightness is crucial to the shooting. Therefore, the light-emitting component can automatically adjust at least one of the color temperature parameter and the brightness parameter among the light-emitting parameters based on the adjustment amount of the atomization degree, so as to ensure the shooting effect.

Correspondingly, it is necessary to pre-establish the corresponding relationship between the adjustment amount of the atomization degree and the brightness compensation amount, and the corresponding relationship between the adjustment amount of the atomization degree and the color temperature compensation amount. Similarly, the corresponding relationship between the adjustment amount of the atomization degree and the brightness compensation amount is a one-to-one correspondence mapping relationship between the adjustment amount of the atomization degree and the brightness compensation amount, which can be a proportional mapping relationship. For example, if the atomization degree increases by 10%, the brightness parameter correspondingly decreases by 100 nits; if the atomization degree decreases by 10%, the brightness parameter correspondingly increases by 100 nits. To keep the brightness of the light originally shining on the photographed object or person unchanged, after adjusting the atomization degree of the soft light panel an infinite number of times, the brightness of the light-emitting component is adjusted for the corresponding number of times, then the brightness of the light-emitting component before and after adjustment are compared to obtain the brightness compensation amount, and the atomization degrees of the soft light panel before and after adjustment are compared to obtain the adjustment amount of the atomization degree, the mapping relationship between the adjustment amount of the atomization degree and the brightness compensation amount can be obtained. Similarly, the corresponding relationship between the adjustment amount of the atomization degree and the color temperature compensation amount is a one-to-one correspondence mapping relationship between the adjustment amount of the atomization degree and the color temperature compensation amount, which can be a proportional mapping relationship. For example, if the atomization degree increases by 10%, the color temperature parameter correspondingly increases by 100 K; if the atomization degree decreases by 10%, the color temperature parameter correspondingly decreases by 100 K. To keep the color temperature of the light originally shining on the photographed object or person unchanged, after adjusting the atomization degree of the soft light panel an infinite number of times, the color temperature of the light-emitting component is adjusted for the corresponding number of times, then the color temperatures of the light-emitting component before and after adjustment are compared to obtain the color temperature compensation amount, and the atomization degrees of the soft light panel before and after adjustment are compared to obtain the adjustment amount of the atomization degree, the mapping relationship between the adjustment amount of the atomization degree and the color temperature compensation amount can be obtained.

Correspondingly, the compensation amount of the light-emitting parameters of the light-emitting component is determined based on the adjustment amount of the atomization degree in step S1020 includes:
  determining the color temperature compensation amount corresponding to the adjustment amount of the atomization degree based on the adjustment amount of the atomization degree and the preset corresponding relationship between the adjustment amount of the atomization degree and the color temperature compensation amount; and/or,
  determining the brightness compensation amount corresponding to the adjustment amount of the atomization degree based on the adjustment amount of the atomization degree and the preset corresponding relationship between the adjustment amount of the atomization degree and the brightness compensation amount.

In the embodiments of the present application, considering that after the atomization degree of the soft light panel is adjusted, the light-emitting parameters of the light passing through the soft light panel, such as the color temperature, will decay. Therefore, the color temperature compensation amount corresponding to the adjustment amount of the atomization degree can be determined based on the adjustment amount of the atomization degree and the preset corresponding relationship between the adjustment amount of the atomization degree and the color temperature compensation amount. Thus, the color temperature parameter of the light-emitting component can be further compensated based on the color temperature compensation amount, so that the color temperature value of the light passing through the soft light panel is consistent with the pre-determined target color temperature value, that is, the color temperature of the light originally shining on the photographed object or person can be kept unchanged.

Similarly, considering that after the atomization degree of the soft light panel is adjusted, the light-emitting parameters of the light passing through the soft light panel, such as the brightness, will decay. Therefore, the brightness compensation amount corresponding to the adjustment amount of the atomization degree can be determined based on the adjustment amount of the atomization degree and the preset corresponding relationship between the adjustment amount of the atomization degree and the brightness compensation amount. Thus, the brightness parameter of the light-emitting component can be further compensated based on the brightness compensation amount, so that the brightness value of the light passing through the soft light panel is consistent with the pre-determined target brightness value, that is, the brightness of the light originally shining on the photographed object or person can be kept unchanged.

Step S1030, adjusting the light-emitting parameters of the light-emitting component based on the compensation amount of the light-emitting parameters of the light-emitting component, so that the light-emitting component emits light based on the adjusted light-emitting parameters.

In the embodiments of the present application, the light-emitting component can obtain the adjustment amount of the atomization degree of the soft light panel through the communication connection with the soft light panel, such as a wireless connection or a wired connection. Thus, the compensation amount of the light-emitting parameters corresponding to the adjustment amount of the atomization degree can be determined according to the adjustment amount of the atomization degree, and the light-emitting parameters can be automatically adjusted accordingly according to the compensation amount of the light-emitting parameters, so that the light-emitting component emits light based on the adjusted light-emitting parameters. Thus, the light-emitting parameters of the light passing through the soft light panel can be made consistent with the pre-determined target light-emitting parameters, that is, the light-emitting parameters of the light originally shining on the photographed object or person can be kept unchanged, and the shooting effect can be ensured.

In an embodiment of the present application, the compensation amount of the light-emitting parameters includes at least one of the brightness compensation amount and the color temperature compensation amount. Correspondingly, adjusting the light-emitting parameters of the light-emitting component based on the compensation amount of the light-emitting parameters of the light-emitting component in step S1030 includes:

adjusting the color temperature parameter of the light-emitting component based on the color temperature compensation amount; and/or, adjusting the brightness parameter of the light-emitting component based on the brightness compensation amount.

In the embodiments of the present application, considering that after the atomization degree of the soft light panel is adjusted, the light-emitting parameters of the light passing through the soft light panel, such as the color temperature, will decay. Therefore, after determining the color temperature compensation amount corresponding to the adjustment amount of the atomization degree, the color temperature value of the light-emitting component can be adjusted based on the color temperature compensation amount, so that the adjusted color temperature value is consistent with the pre-determined target color temperature value, to meet the light adjustment requirements and ensure the shooting effect.

Similarly, considering that after the atomization degree of the soft light panel is adjusted, the light-emitting parameters of the light passing through the soft light panel, such as the brightness, will decay. Therefore, after the brightness compensation amount corresponding to the adjustment amount of the atomization degree is determined, the brightness value of the light-emitting component can be adjusted based on the brightness compensation amount, so that the adjusted brightness value is consistent with the pre-determined target brightness value, to meet the light adjustment requirements and ensure the shooting effect.

Figure 11:
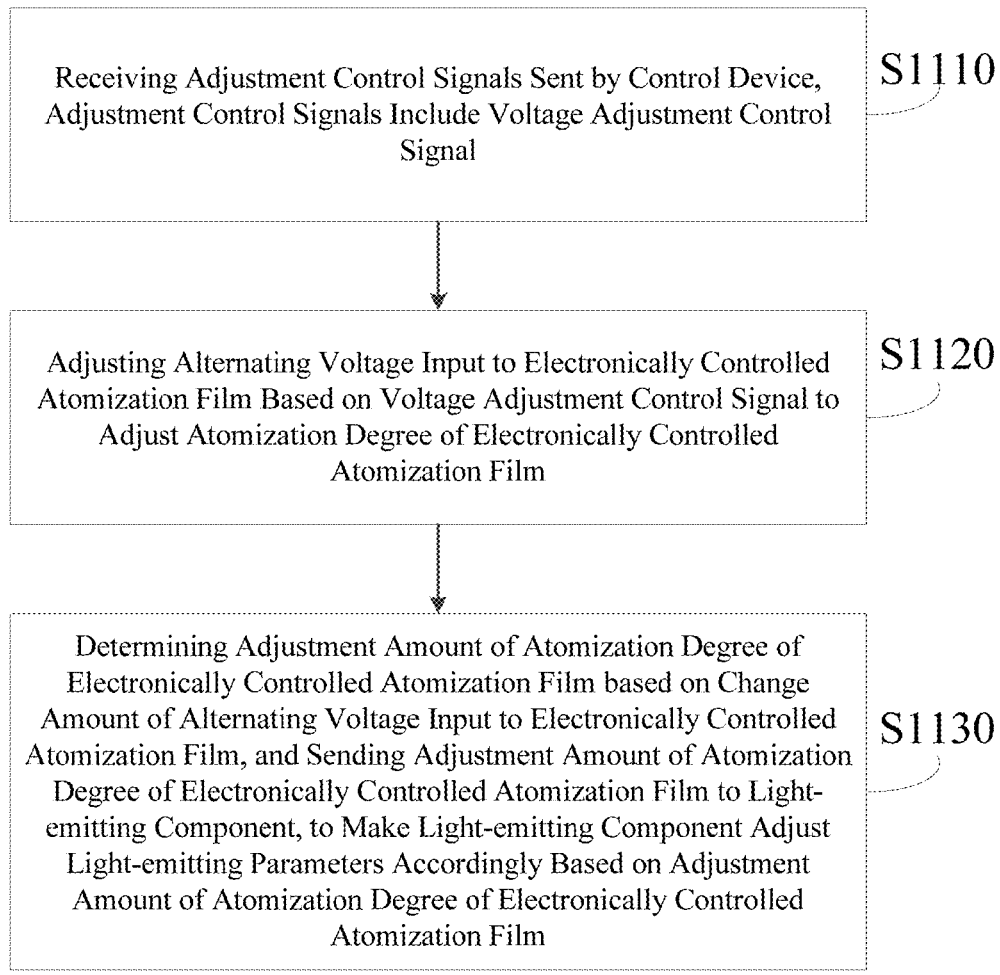
FIG. 11 is a fourth flowchart of the light adjustment control method provided in the embodiment of the present application.

Referring to FIG. 11. FIG. 11 is a fourth flowchart of the light adjustment control method provided in the embodiment of the present application, which is executed based on the light adjustment system 2 provided in any embodiment of the present application, and includes but is not limited to steps S1110 to S1130.

Step S1110, receiving the adjustment control signals sent by the control device, the adjustment control signals include a voltage adjustment control signal;

Step S1120, adjusting the alternating voltage input to the electronically controlled atomization film based on the voltage adjustment control signal to adjust the atomization degree of the electronically controlled atomization film; and Step S1130, determining the adjustment amount of the atomization degree of the electronically controlled atomization film based on the change amount of the alternating voltage input to the electronically controlled atomization film, and sending the adjustment amount of the atomization degree of the electronically controlled atomization film to the light-emitting component, to make the light-emitting component adjust the light-emitting parameters accordingly based on the adjustment amount of the atomization degree of the electronically controlled atomization film.

In the embodiments of the present application, the control box is in communication connection with the external control device, so that it can receive the adjustment control signals sent by the control device, the adjustment control signals includes a voltage adjustment control signal. Thus, the control box can adjust the alternating voltage input to the electronically controlled atomization film based on the voltage adjustment control signal to adjust the atomization degree of the electronically controlled atomization film, to make the atomization degree of the soft light panel adjustable. However, during the shooting process, after the atomization degree of the soft light panel is adjusted based on the atomization degree requirement, considering that the light-emitting parameters of the light passing through the soft light panel will decay, the light-emitting parameters of the light passing through the soft light panel will be inconsistent with the pre-determined target light-emitting parameters, affecting the shooting effect. Therefore, in order to keep the light-emitting parameters of the light originally shining on the photographed object or person unchanged, after the soft light panel adjusts the atomization degree, the soft light panel can send the adjustment amount of the atomization degree to the light-emitting component through the communication connection with the light-emitting component, so that the light-emitting component can determine the corresponding compensation amount of the light-emitting parameters based on the adjustment amount of the atomization degree, and make corresponding compensation for the light-emitting parameters of the light-emitting component based on the compensation amount of the light-emitting parameters. After compensation, the light-emitting parameters of the light passing through the soft light panel can be made consistent with the pre-determined target light-emitting parameters to meet the lighting effect requirements and ensure the shooting effect. The determination methods of the adjustment amount of the atomization degree include: calculating the corresponding adjustment amount of the atomization degree based on the voltage difference input to the electronically controlled atomization film, or determining the corresponding atomization degree based on the voltage value input to the electronically controlled atomization film, then obtaining the atomization degree of the soft light panel before adjustment and the atomization degree after adjustment, and subtracting the atomization degree of the soft light panel before adjustment from the atomization degree after adjustment to obtain the adjustment amount of the atomization degree of the soft light panel.

In an embodiment of the present application, the adjustment control signal further includes a frequency adjustment control signal, and the light adjustment method executed by the soft light panel further includes:

receiving the frequency adjustment control signal, the frequency adjustment control signal is generated by the control device based on the shooting frequency of the camera, and the camera uses the light emitted by the light-emitting component and passing through the soft light panel for shooting;

adjusting the frequency of the alternating current input to the electronically controlled atomization film based on the frequency adjustment control signal to make the frequency of the alternating current input to the electronically controlled atomization film match the shooting frequency of the camera.

In the embodiments of the present application, while the soft light panel can realize the adjustability of the atomization degree, considering that when using the electronically controlled atomization film as the soft light panel to adjust the softness of the light, if the frequency of the alternating current input to the electronically controlled atomization film does not match the shooting frequency of the camera, stroboscopic stripes will be displayed on the video shot by the camera, which greatly affects the shooting imaging effect. In this regard, in addition to adjusting the alternating voltage input to the electronically controlled atomization film based on the voltage adjustment control signal to adjust the atomization degree of the electronically controlled atomization film, the soft light panel in the embodiments of the present application can also adjust the frequency of the alternating current input to the electronically controlled atomization film according to the frequency adjustment control signal to make the frequency of the alternating current input to the electronically controlled atomization film match the shooting frequency of the camera, thus effectively solving the problem of stroboscopic stripes caused by the mismatch between the operation frequency of the electronically controlled atomization film and the shooting frequency of the camera.

The embodiments of the present application also provide an electronic device, which includes a memory and a processor. The memory stores a computer program, and when the processor executes the computer program, the above-mentioned light adjustment control method is implemented.

Figure 12:
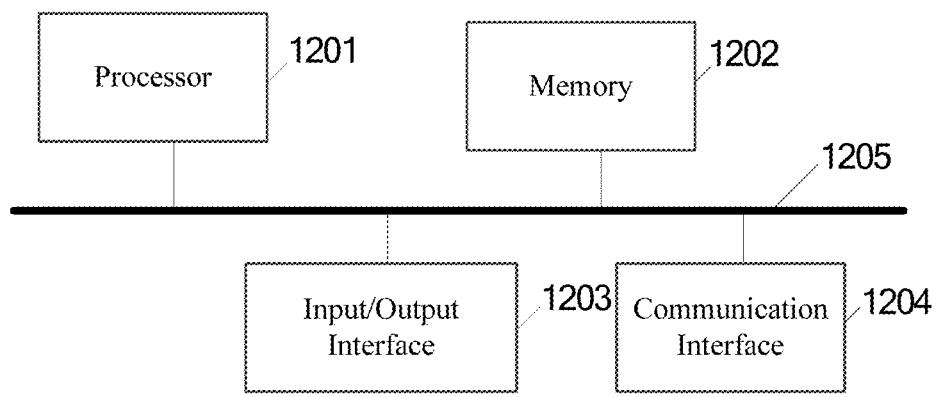
FIG. 12 is a schematic structural block diagram of the electronic device provided in the embodiment of the present application.

Please refer to FIG. 12. FIG. 12 is the hardware structure of an electronic device in another embodiment. The electronic device includes:

a processor 1201, which can be implemented by means of a general Central Processing Unit (CPU), a microprocessor, an Application Specific Integrated Circuit (ASIC), or one or more integrated circuits, etc., and is used to execute relevant programs to implement the technical solutions provided in the embodiments of the present application;

a memory 1202, which can be implemented in the form of a Read Only Memory (ROM), a static storage device, a dynamic storage device, or a Random Access Memory (RAM), etc. The memory 1202 can store the operating system and other application programs. When implementing the technical solutions provided in the embodiments of this specification through software or firmware, the relevant program codes are stored in the memory 1202, and the processor 1201 is used to call and execute the light adjustment control method provided in any embodiment of the present application;

an Input/Output interface 1203, which is used to realize information input and output; Communication interface 1204, which is used to realize the communication interaction between this device and other devices. It can realize communication through a wired method (such as USB, network cable, etc.) or a wireless method (such as mobile network, WIFI, Bluetooth, etc.);

a bus 1205, which transmits information among various components of the device (such as the processor 1201, the memory 1202, the input/output interface 1203, and the communication interface 1204);

the processor 1201, the memory 1202, the input/output interface 1203, and the communication interface 1204 realize the communication connection inside the device with each other through the bus 1205.

The embodiments of the present application also provide a storage medium. The storage medium is a computer-readable storage medium. The storage medium stores a computer program, and when the computer program is executed by a processor, the above-mentioned light adjustment control method is implemented.

As a non-transitory computer-readable storage medium, the memory can be used to store non-transitory software programs and non-transitory computer-executable programs. In addition, the memory can include high-speed random access memory, and can also include non-transitory memory, such as at least one disk storage device, a flash memory device, or other non-transitory solid-state storage devices. In some embodiments, the memory may optionally include a memory remotely set relative to the processor, and these remote memories can be connected to the processor through a network. Examples of the above-mentioned network include but are not limited to the Internet, an intranet, a local area network, a mobile communication network, and a combination thereof.

The embodiments described in the embodiments of the present application are for more clearly explaining the technical solutions of the embodiments of the present application, and do not constitute a limitation to the technical solutions provided in the embodiments of the present application.

Those skilled in the art know that with the evolution of technology and the emergence of new application scenarios, the technical solutions provided in the embodiments of the present application are also applicable to similar technical problems.

Those skilled in the art can understand that the technical solutions shown in the figures do not constitute a limitation to the embodiments of the present application, and may include more or fewer steps than those shown in the figures, or combine certain steps, or have different steps.

The preferred embodiments of the embodiments of the present application have been described above with reference to the accompanying drawings, but the scope of rights of the embodiments of the present application is not limited thereby. Any modification, equivalent replacement, and improvement made by those skilled in the art without departing from the scope and essence of the embodiments of the present application shall fall within the scope of the embodiments of the present application.

What is claimed is:

1. A soft light panel, comprising:
an electronically controlled atomization film and a control box, wherein the electronically controlled atomization film is electrically connected to the control box;
wherein the control box comprises a communication module, a regulation module, an inverter circuit module, and a direct current module;
the communication module is electrically connected to the regulation module, the regulation module is electrically connected to the inverter circuit module, the inverter circuit module is electrically connected to the electronically controlled atomization film, and the direct current module is electrically connected to the regulation module and the inverter circuit module;
the direct current module is configured to provide direct current power for the regulation module and the inverter circuit module;
the communication module is configured to establish a communication connection with an external control device to receive adjustment control signals sent by the external control device;
wherein the adjustment control signals comprise a voltage adjustment control signal and a frequency adjustment control signal;
the regulation module is configured to output a voltage output signal corresponding to the voltage adjustment control signal to the inverter circuit module based on the voltage adjustment control signal, and output a frequency output signal corresponding to the frequency adjustment control signal to the inverter circuit module based on the frequency adjustment control signal; and
the inverter circuit module is configured to output an adjusted alternating voltage to the electronically controlled atomization film based on the voltage output signal to adjust an atomization degree of the electronically controlled atomization film, and output an adjusted frequency of alternating current to the electronically controlled atomization film based on the frequency output signal to adjust an operation frequency of the electronically controlled atomization film.

2. The soft light panel according to claim 1, wherein the regulation module comprises a voltage regulation unit and a frequency regulation unit, and the voltage regulation unit and the frequency regulation unit are electrically connected to the inverter circuit module;
the voltage regulation unit is configured to output a voltage output signal corresponding to the voltage adjustment control signal based on the voltage adjustment control signal; and
the frequency regulation unit is configured to output a frequency output signal corresponding to the frequency adjustment control signal based on the frequency adjustment control signal.

3. The soft light panel according to claim 1, wherein the communication module is further configured to establish a communication connection with a camera;
the control box further comprises a frequency acquisition module, and the frequency acquisition module is electrically connected to the communication module and the inverter circuit module; and
the frequency acquisition module is configured to acquire a shooting frequency of the camera, generate a corresponding frequency adjustment control signal based on the shooting frequency of the camera, and output the frequency adjustment control signal to the inverter circuit module, to make the inverter circuit module output an adjusted frequency of the alternating current to the electronically controlled atomization film based on the frequency adjustment control signal, to make the operation frequency of the electronically controlled atomization film match the shooting frequency of the camera.

4. The soft light panel according to claim 1, further comprising a support frame, wherein the electronically controlled atomization film is provided on the support frame, and the support frame is able of being flipped horizontally and vertically to adjust an angle of the electronically controlled atomization film.

5. A light adjustment system, comprising:
a control device;
a soft light panel, in communication connection with the control device;
wherein the control device is configured to send adjustment control signals to the soft light panel, to make an atomization degree and an operation frequency of the soft light panel be adjustable; the adjustment control signals comprise a voltage adjustment control signal and a frequency adjustment control signal;
a light-emitting component, wherein the soft light panel is provided on a light-emitting side of the light-emitting component;
wherein the soft light panel comprises:
an electronically controlled atomization film and a control box, wherein the electronically controlled atomization film is electrically connected to the control box;
wherein the control box comprises a communication module, a regulation module, an inverter circuit module, and a direct current module;
the communication module is electrically connected to the regulation module, the regulation module is electrically connected to the inverter circuit module, the inverter circuit module is electrically connected to the electronically controlled atomization film, and the direct current module is electrically connected to the regulation module and the inverter circuit module;
the direct current module is configured to provide direct current power for the regulation module and the inverter circuit module;
the communication module is configured to establish a communication connection with an external control device to receive adjustment control signals sent by the external control device;
wherein the adjustment control signals comprise a voltage adjustment control signal and a frequency adjustment control signal;

the regulation module is configured to output a voltage output signal corresponding to the voltage adjustment control signal to the inverter circuit module based on the voltage adjustment control signal, and output a frequency output signal corresponding to the frequency adjustment control signal to the inverter circuit module based on the frequency adjustment control signal; and the inverter circuit module is configured to output an adjusted alternating voltage to the electronically controlled atomization film based on the voltage output signal to adjust an atomization degree of the electronically controlled atomization film, and output an adjusted frequency of alternating current to the electronically controlled atomization film based on the frequency output signal to adjust an operation frequency of the electronically controlled atomization film.

6. The light adjustment system according to claim 5, wherein the control device comprises a communication unit, a voltage adjustment control component, and a frequency adjustment control component;

the communication unit is in communication connection with the communication module in the soft light panel;

the voltage adjustment control component is electrically connected to the communication unit to send a voltage adjustment control signal to the soft light panel through the communication unit; and the frequency adjustment control component is electrically connected to the communication unit to send a frequency adjustment control signal to the soft light panel through the communication unit.

7. A light adjustment control method, applied to the light-emitting component in the light adjustment system according to claim 5;

wherein the method comprises:

obtaining an adjustment amount of an atomization degree of the electronically controlled atomization film;

determining compensation amount of light-emitting parameters of the light-emitting component based on the adjustment amount of the atomization degree and a preset corresponding relationship between the adjustment amount of the atomization degree and the compensation amount of the light-emitting parameters; and adjusting the light-emitting parameters of the light-emitting component based on the compensation amount of the light-emitting parameters of the light-emitting component, to make the light-emitting component emit light based on the adjusted light-emitting parameters.

8. The method according to claim 7, wherein the compensation amount of the light-emitting parameters comprises at least one of a brightness compensation amount and a color temperature compensation amount.

9. The method according to claim 8, wherein determining the compensation amount of the light-emitting parameters of the light-emitting component based on the adjustment amount of the atomization degree and the preset corresponding relationship between the adjustment amount of the atomization degree and the compensation amount of the light-emitting parameters comprises:

determining the color temperature compensation amount corresponding to the adjustment amount of the atomization degree based on the adjustment amount of the atomization degree and a preset corresponding relationship between the adjustment amount of the atomization degree and the color temperature compensation amount.

10. The method according to claim 8, wherein determining the compensation amount of the light-emitting parameters of the light-emitting component based on the adjustment amount of the atomization degree and the preset corresponding relationship between the adjustment amount of the atomization degree and the compensation amount of the light-emitting parameters comprises:

determining the brightness compensation amount corresponding to the adjustment amount of the atomization degree based on the adjustment amount of the atomization degree and a preset corresponding relationship between the adjustment amount of the atomization degree and the brightness compensation amount.

11. The method according to claim 8, wherein adjusting the light-emitting parameters of the light-emitting component based on the compensation amount of the light-emitting parameters of the light-emitting component comprises:

adjusting a color temperature parameter of the light-emitting component based on the color temperature compensation amount.

12. The method according to claim 8, wherein adjusting the light-emitting parameters of the light-emitting component based on the compensation amount of the light-emitting parameters of the light-emitting component comprises:

adjusting a brightness parameter of the light-emitting component based on the brightness compensation amount.

13. A light adjustment control method, applied to the soft light panel in the light adjustment system according to claim 5;

wherein the method comprises:

receiving adjustment control signals sent by the control device, where the adjustment control signals comprise voltage adjustment control signals;

adjusting the alternating voltage input to the electronically controlled atomization film based on the voltage adjustment control signal to adjust the atomization degree of the electronically controlled atomization film; and determining the adjustment amount of the atomization degree of the electronically controlled atomization film based on a change amount of the alternating voltage input to the electronically controlled atomization film, and sending the adjustment amount of the atomization degree of the electronically controlled atomization film to the light-emitting component, to make the light-emitting component adjust the light-emitting parameters accordingly based on the adjustment amount of the atomization degree of the electronically controlled atomization film.

14. The method according to claim 13, wherein the adjustment control signals further comprise a frequency adjustment control signal, and the method further comprises:

receiving the frequency adjustment control signal, where the frequency adjustment control signal is generated by the control device based on a shooting frequency of the camera, and the camera uses the light emitted by the light-emitting component and passing through a soft light panel for shooting; and adjusting a frequency of the alternating current input to the electronically controlled atomization film based on the frequency adjustment control signal, to make the frequency of the alternating current input to the electronically controlled atomization film match the shooting frequency of the camera.

15. A camera system, comprising:
a light-emitting component;
a soft light panel, provided on a light-emitting side of the light-emitting component;
a control device, in communication connection with the soft light panel;
wherein the control device is configured to send adjustment control signals to the soft light panel, to make the atomization degree and an operation frequency of the soft light panel be adjustable;
the adjustment control signals comprise a voltage adjustment control signal and a frequency adjustment control signal;
a camera, in communication connection with the control device, to make the control device acquire a shooting frequency of the camera and generate a corresponding frequency adjustment control signal based on the shooting frequency of the camera;
wherein the soft light panel comprises:
an electronically controlled atomization film and a control box, wherein the electronically controlled atomization film is electrically connected to the control box;
wherein the control box comprises a communication module, a regulation module, an inverter circuit module, and a direct current module;
the communication module is electrically connected to the regulation module, the regulation module is electrically connected to the inverter circuit module, the inverter circuit module is electrically connected to the electronically controlled atomization film, and the direct current module is electrically connected to the regulation module and the inverter circuit module;
the direct current module is configured to provide direct current power for the regulation module and the inverter circuit module;
the communication module is configured to establish a communication connection with an external control device to receive adjustment control signals sent by the external control device;
wherein the adjustment control signals comprise a voltage adjustment control signal and a frequency adjustment control signal;
the regulation module is configured to output a voltage output signal corresponding to the voltage adjustment control signal to the inverter circuit module based on the voltage adjustment control signal, and output a frequency output signal corresponding to the frequency adjustment control signal to the inverter circuit module based on the frequency adjustment control signal; and
the inverter circuit module is configured to output an adjusted alternating voltage to the electronically controlled atomization film based on the voltage output signal to adjust an atomization degree of the electronically controlled atomization film, and output an adjusted frequency of alternating current to the electronically controlled atomization film based on the frequency output signal to adjust an operation frequency of the electronically controlled atomization film.

16. The camera system according to claim 15, wherein the camera is also in communication connection with the soft light panel, to make the soft light panel acquire the shooting frequency of the camera and generate the corresponding frequency adjustment control signal based on the shooting frequency of the camera.

17. A light adjustment control method, applied to the camera system according to claim 15;
wherein the method comprises:
generating adjustment control signals, where the adjustment control signals comprise a voltage adjustment control signal and a frequency adjustment control signal;
adjusting the alternating voltage input to the electronically controlled atomization film based on the voltage adjustment control signal to adjust the atomization degree of the electronically controlled atomization film; and
adjusting the frequency of the alternating current input to the electronically controlled atomization film based on the frequency adjustment control signal, to make the operation frequency of the electronically controlled atomization film match the shooting frequency of the camera.

18. An electronic device, comprising a memory and a processor;
wherein the memory stores a computer program, and when the processor executes the computer program, the method executed in claim 7.

19. A computer-readable storage medium, on which a computer program is stored;
when the computer program is executed by a processor, the method executed in claim 7.

* * * * *